Patented Aug. 7, 1934

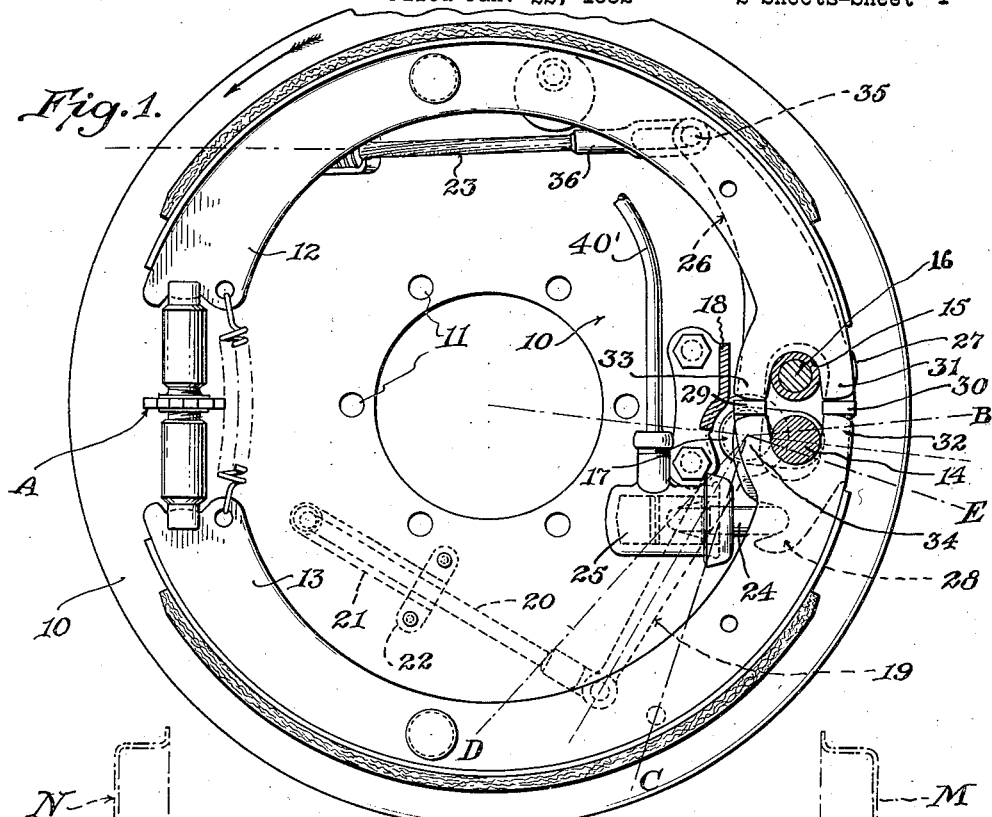

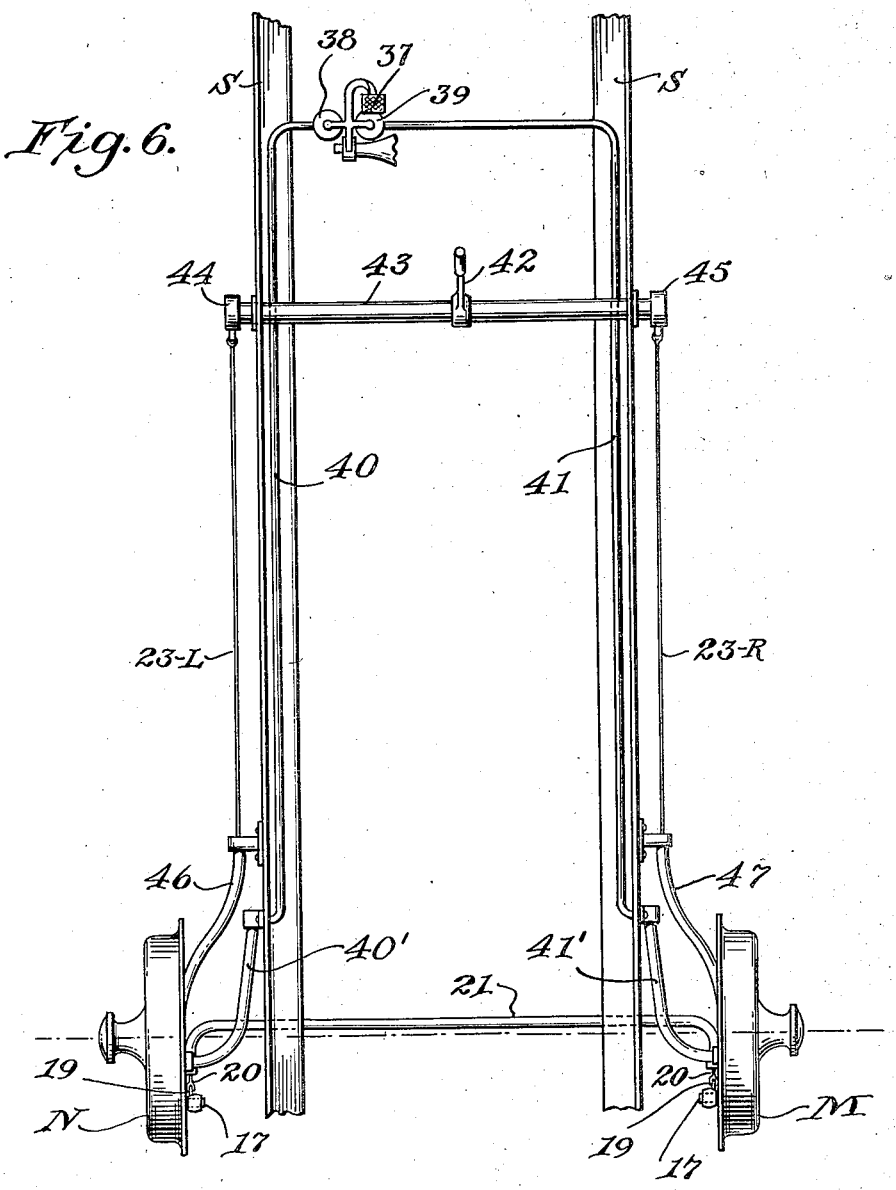

1,969,161

UNITED STATES PATENT OFFICE 1,969,161

AUTOMOBILE BRAKE

George L. Smith, Rockford, Ill., assignor to United States Ordnance Company, Washington, D. C., a corporation of Virginia Application January 22, 1932, Serial No. 588,041

8 Claims. (Cl. 188—2)

My invention relates to automobile brakes and particularly those of the internal two shoe full wrap type, although in no way limited to such type of brake where it is applicable for use with other types of brakes, either internal or external.

The purpose of my invention is to provide a brake which can be applied by either a mechanical or an hydraulic mechanism and which will permit a pair of brakes to be cross-connected as set forth and claimed in my prior Patent 1,440,842, so that when such pair of the brakes are simultaneously applied by either mechanism, the cross-connection will operate through the anchorages of the brakes, with whichever mechanism is utilized to apply the brakes, to automatically equalize their torque.

My invention also contemplates a brake construction selectively operable by either mechanical or hydraulic mechanisms and which can be easily converted into a brake having only one of said mechanisms by the removal of very few parts and without the necessity of supplying any additional parts.

In the drawings chosen to illustrate my invention the scope whereof is set forth in the appended claims—

Figure 1 is a side elevation of a left rear brake of an automobile with the brake drum removed, said brake being constructed in accordance with my invention;

Figure 2, a view showing the anchorages of two of my brakes cross-connected so as to provide for the equalization of the torque of the brakes when the latter are simultaneously applied;

Figure 3, a view showing the combined hydraulic and mechanical brake lever which is employed in the structure of Figure 1;

Figure 4, a view showing the form of the brake lever when the hydraulic brake applying mechanism is not embodied in the brake structure;

Figure 5, a view, showing the form of the brake lever when the mechanical brake applying mechanism is not embodied in the brake structure; and Figure 6, a view showing two automobile brakes in accordance with my invention connected up for simultaneous application both mechanically and hydraulically and also cross-connected for torque equalization when simultaneously applied either mechanically or hydraulically.

Referring to the drawings my improved brake structure is shown as comprising a backing plate 10 which is adapted to be bolted to an axle (not shown) through the instrumentality of bolts passing through the bolt holes 11, all as is well known. My improved brake construction embodies two shoes, a primary shoe 12 and a secondary shoe 13, said shoes being connected by a suitable adjusting device A. My brake anchors for ahead braking on a crank 14 and backing braking on a rigid sleeve 15 held to the backing plate by a bolt 16. The shaft 17 of crank 14 is journaled in the backing plate on one end and in a bearing in the bracket 18 at the other end. Outside of the bearing in the backing plate a lever 19 is keyed to the shaft, and this lever is cross-connected to a corresponding lever on the right rear brake by the tension wire 20 operating through a flexible conduit 21 having its ends secured to the backing plates by clips 22.

When a braking force is carried by the crank 14 the crank can swing to line "B" when it will be stopped by sleeve 15 and in this position lever 19 swings to line "C", pulling wire 20 with it. On the right brake, lever 19 has swung in the opposite direction to line "D" and crank 14 to line "E". Thus it is seen that the anchor 14 for braking ahead movement of the vehicle is a yielding one with the right anchor reacting against the left one and vice-versa. This type of anchorage is an essential element for torque equalization of two opposite brakes and is similar in principle to those anchorages shown in my previous Patents Nos. 1,440,842; 1,490,640; 1,490,642; 1,771,969, and others.

As explained in the aforesaid patents, the brake setting mechanism is adapted to be affected by the rotation of the brake under the swinging movement of crank 14 in such a way that the brake exerting the greater torque, for instance the right one, and carrying its crank with it in the direction of rotation of the brake drum "M" will be slacked up, while the opposite brake will be tightened. To accomplish this result, the brake expanding force on the brake lever 27 must act off the drum center and in a direction corresponding to the direction of rotation of the drum. This is the case for braking ahead rotation. For the opposite direction of rotation the brake is anchored on the fixed anchorage 15 and the brake setting force is not affected in any way since equalization in braking rearward movement is not necessary.

In Figure 1 it will be noted that the brake expanding force can be applied in two ways, by a pull wire 23 and by the piston rod 24 of an hydraulic cylinder 25. The pull wire acts on the long arm 26 of brake lever 27 in a direction corresponding to the drum rotation for ahead movement of the vehicle, and at a distance above the drum center, while the piston rod 24 pushes on the short arm 28 of lever 27, also in a direction corresponding to said rotation of drum and at a distance below the drum center. It is evident that any rotation of the shoe in a counter-clockwise direction in Fig. 1 would act to diminish the brake expanding action of lever 27 while rotation in the opposite direction would increase this action so that the brake expanding mechanism coacts with the brake anchoring mechanism for braking ahead movement of the vehicle in such a way that the braking torques of the two brakes are equalized. This condition is present irrespective of whether the lever 27 is operated mechanically or hydraulically.

The brake expanding lever 27 shown more plainly in Fig. 3 carries two lugs 29 and 30 which occupy the spaces between the ends 31 and 32 of the two shoes on one side of the anchorage mechanism and ends 33 and 34 of the two shoes on the other side, so that these lugs act, when the brake lever is operated, to pry the two ends of the brake apart. If this is done through the action of the pull wire 23, then the short arm 28 of lever 27 travels away from the piston rod 24. If movement of the lever is produced by the hydraulic cylinder, then the pivot 35 at head of lever arm 26 travels back in the slot in end fitting 36 of the pull wire 23. These over-running connections permit the operation of lever 27 by either device without disturbing the other one.

With the construction of parts as shown and described it is apparent that the following combinations are easily produced when a four wheel automotive brake system is equipped with my improved brake, to wit:

(a) Four mechanically operated brakes by leaving off the hydraulic cylinders and the short arms 28 of the levers 27, all other parts remaining the same.

(b) Four hydraulically operated brakes by leaving off pull wires 23 and long arms 26 of levers 27, all other parts remaining the same.

(c) Four hydraulic brakes with two mechanical wheel emergency brakes by operating the four brakes hydraulically by a foot pedal and by retaining the pull wires 23 on the two rear brakes as shown in Fig. 1, these wires being connected to the emergency brake lever.

(d) Four hydraulically operated brakes and four mechanically operated brakes by retaining all parts as shown in Fig 1, the four cylinders being connected to a foot pedal and the four wires to an emergency brake lever.

In Figure 6 I have shown two of my brakes utilized as the rear brakes in an automobile with the anchorages of the brakes cross-connected in the manner heretofore described for the purpose of automatic torque equalization when the brakes are automatically applied either through the mechanical brake applying mechanism or through the hydraulic brake applying mechanism. Referring particularly to the disclosure of Figure 6, S, S are the side frames of the automobile and M, N the two rear brakes. A foot pedal 37 operates the plungers of two pumps 38 and 39. These pumps are connected to the right and left cylinders 25 by the pipes 40 and 41 leading along the side frames, and the flexible tubes 40' and 41'. When the foot pedal 37 is depressed operating the plungers of the pumps 38 and 39, equal amounts of liquid are forced to the two rear brakes thus forcing piston rods 24 against the brake levers. For any given movement of pedal the strokes of the two piston rods will be the same. The parts just referred to constitute the service brake applying mechanism.

For the emergency brake applying mechanism a hand lever 42 is provided to operate a cross shaft 43 carried by the side frames S, S. The ends of this shaft are fitted with downwardly extending levers 44 and 45. The brake pull wires 23—R and 23—L extend forward through the flexible conduits 46 and 47 and their ends are secured to the arms of levers 44 and 45. By pulling backward on lever 42 the pull wires 23 are placed in tension and the brakes applied.

While only two brakes are shown it is evident that four brakes can be operated by the pedal 37 and lever 42 by adding the necessary parts.

I claim:

1. In a brake mechanism, a drum, a brake element for engaging the drum, a two-arm brake applying lever housed inside the drum, an hydraulic brake applying mechanism connected to one arm of said lever, and a mechanical brake applying mechanism connected to the other arm of said lever.

2. In a brake mechanism, a drum, an internal expanding brake element having a gap between the ends thereof, a floating brake lever housed inside the drum and provided with lugs extending into said gap, and two brake actuating means connected to said lever, each independently operable to impart brake applying movement to the lever.

3. In a brake mechanism, a drum, an internal expanding brake element having a gap between the ends thereof, a brake lever housed inside the drum and having lugs extending into said gap, two independently operable mechanisms connected to said lever to actuate the latter, and a yieldable anchor for anchoring said brake element the same movement of which is effective to reduce the brake applying effort of either mechanism.

4. A brake applying lever having lugs intermediate its ends for engagement with the ends of an expanding brake element, and further having formations at its ends providing means for operatively connecting therewith mechanical and hydraulic brake applying mechanisms respectively.

5. In a brake system, a pair of brakes, a brake applying mechanism operable to simultaneously apply the brakes, and anchoring means for said brakes comprising a swingable crank embodied in each brake swinging about an axis parallel to the axis of its related brake, a lever fixed on the shaft of each crank, and means cross-connecting the lever on the crank shaft of one anchor with the lever on the crank shaft of the other anchor.

6. In a brake system, a pair of brakes, a brake applying mechanism operable to simultaneously apply the brakes, and anchoring means for said brakes comprising a swingable crank embodied in each brake swinging about an axis parallel to the axis of its related brake, a lever fixed on the shaft of each crank, and a flexible tension member cross-connecting the lever on the crank shaft of one brake with the lever on the crank shaft of the other brake.

7. In a brake mechanism, a pair of brakes each comprising a rotatable drum, a brake element for engaging the drum, a two-arm brake lever housed inside the drum, an hydraulic brake applying mechanism connected to one arm of said lever, a mechanical brake applying mechanism connected to the other arm of said lever, both of said mechanisms operating to swing the lever in the same direction, a common means for simultaneously operating the hydraulic brake applying mechanisms of the two brakes, a common means for simultaneously operating the mechanical brake applying mechanisms of the two brakes, and an anchoring mechanism for the brake elements of both brakes coacting with either of the brake applying mechanisms when simultaneously operated to equalize the torque of said brakes.

8. In a brake mechanism, a drum, a brake element for engaging the drum, a two-arm brake applying lever housed inside the drum, a hydraulic brake applying mechanism connected to one arm of said lever, mechanical brake applying mechanism connected to the other arm of said lever, and a yieldable anchor for anchoring said brake element the same movement of which is effective to reduce the brake applying effort of either mechanism.

GEORGE L. SMITH.